(12) United States Patent
Hanckel et al.

(10) Patent No.: US 12,083,841 B2
(45) Date of Patent: Sep. 10, 2024

(54) PRE-ASSEMBLY DEVICE FOR PRE-ASSEMBLING AN AIR SPRING ON A BODY AND A SYSTEM COMPRISING THE PRE-ASSEMBLY DEVICE

(71) Applicant: Vibracoustic SE, Darmstadt (DE)

(72) Inventors: Kjell Hanckel, Hamburg (DE); Oliver Langhof, Moelln (DE)

(73) Assignee: Vibracoustic SE, Darmstadt (DE)

( * ) Notice: Subject to any disclaimer, the term of this patent is extended or adjusted under 35 U.S.C. 154(b) by 358 days.

(21) Appl. No.: 17/553,067

(22) Filed: Dec. 16, 2021

(65) Prior Publication Data
US 2022/0194155 A1 Jun. 23, 2022

(30) Foreign Application Priority Data

Dec. 21, 2020 (DE) .......................... 102020134376.0

(51) Int. Cl.
*B60G 11/28* (2006.01)
*B60G 11/27* (2006.01)

(52) U.S. Cl.
CPC .............. *B60G 11/28* (2013.01); *B60G 11/27* (2013.01); *B60G 2202/152* (2013.01); *B60G 2204/126* (2013.01); *B60G 2204/4404* (2013.01)

(58) Field of Classification Search
CPC ................ B60G 11/28; B60G 11/27; B60G 2204/4404; B60G 2202/152; B60G 2204/126; B60G 2206/424; B62D 65/12
See application file for complete search history.

(56) References Cited

U.S. PATENT DOCUMENTS 5,375,870 A * 12/1994 Smith ................... B60G 15/067
280/124.109
6,523,817 B1 * 2/2003 Landry, Jr. ............ F16F 1/3732
296/35.1

(Continued)

FOREIGN PATENT DOCUMENTS

| CA | 2354975 C | 11/2005 |
| DE | 3716099 A1 | 1/1988 |
| DE | 102014015539 A1 | 4/2016 |

OTHER PUBLICATIONS

Translation of German Patent No. DE 3716099 obtained from website: https://worldwide.espacenet.com on Feb. 6, 2024.*

(Continued)

*Primary Examiner* — Pamela Rodriguez
(74) *Attorney, Agent, or Firm* — Fishman Stewart PLLC

(57) ABSTRACT

The invention relates to a preassembly device for preassembling an air spring on a body (e.g., a car body) that has an assembly interface. Embodiment of the preassembly device include a centering member for centering the preassembly device on the assembly interface, and a connector for connecting to an air spring. With embodiments, the preassembly device further includes a carrier (or support element) extending away from the preassembly device. A seal provided on the carrier for sealing a discharge opening of the body may be provided at the assembly interface, wherein the centering member may be configured for aligning the seal at the discharge opening. The invention provides a device that can provide a low-cost and simple sealing of the outlet openings in the area of the mounting interface.

19 Claims, 2 Drawing Sheets

(56) References Cited

U.S. PATENT DOCUMENTS

| | | | |
|---|---|---|---|
| 9,873,470 B2 | 1/2018 | Mildner et al. | |
| 2013/0249180 A1* | 9/2013 | Matsumura | B60G 99/00 280/124.1 |
| 2014/0049019 A1* | 2/2014 | Ahn | B62D 21/09 280/124.155 |

OTHER PUBLICATIONS

German Office Action, DE 10 2020 134 376.0, dated Aug. 10, 2021, with google translation.

* cited by examiner

PRE-ASSEMBLY DEVICE FOR PRE-ASSEMBLING AN AIR SPRING ON A BODY AND A SYSTEM COMPRISING THE PRE-ASSEMBLY DEVICE

CROSS-REFERENCE TO RELATED APPLICATIONS

This application claims priority to German Patent Application No. DE 10 2020 134 376.0, filed Dec. 21, 2020, the contents of which are hereby incorporated by reference in its entirety.

TECHNICAL FIELD

The invention relates to a preassembly device for preassembling an air spring to a car body and a system comprising the preassembly device.

BACKGROUND

Car bodies or body parts subjected to a cathodic dip painting process (CDP process) have outlet openings for the CDP process. Moisture and/or dirt can penetrate the outlet openings into the area below the outlet openings. This can cause these areas to corrode. To prevent this corrosion, the outlet openings of the body or body parts are sealed. Outlet openings are also present in the area of mounting interfaces for air springs. This seal should be located outside the force flow of the connection between the air spring and the body or body part at the mounting interface to avoid stressing the seal.

To seal openings in the mounting interface area, it is known from CA 2 354 975 C to use an O-ring. However, O-rings are subject to a risk of loss during assembly.

However, it is also known to use foam ribs, which are relatively cost-intensive. The use of lost ribs is also known. However, these are located in the force flow between the air spring and the body. They are subject to a risk of damage during installation. However, they lose their sealing effect when the air spring is removed or in a temporarily depressurized state, e.g., for servicing.

It is, therefore, the task of the invention to provide a device that creates a cost-effective and straightforward seal for the outlet openings in the area of the mounting interface.

Features and embodiments of the inventive concepts are disclosed herein.

SUMMARY

The invention relates to a preassembly device for preassembling an air spring to a car body having an assembly interface, the preassembly device comprising a centering member (which may also be referred to herein as a centering element or centering pin) configured for centering the preassembly device at or about the assembly interface, and a connector (which may also be referred to herein as a connecting member or connecting element) for connecting to an air spring. According to aspects of the invention, the preassembly device may further comprise: a support member extending away from the preassembly device, and at least one seal (which may also be referred to herein as a sealing member or sealing element) that may be provided or arranged on the support member for sealing an outlet opening of the body that is provided or arranged at or about the assembly interface, wherein the centering member is further adapted for aligning the sealing member at or about the outlet opening.

The invention thus provides a preassembly device that has multiple functions. The preassembly device can connect to the air spring, with the connecting element for connecting to the air spring. Since the air spring is generally cylindrical in structure, at least in sections, the preassembly device may be disposed of at one end of the cylinder. It may extend about the air spring's cylinder axis, which overlaps with a central axis of the preassembly device when the preassembly device is attached to the air spring. The centering element is then used to position the air spring connected to the preassembly device at the assembly interface of the body. The term body in this context refers to both the entire body and individual parts of the body, i.e., body parts. An air spring can be preassembled on an assembly interface of a car body utilizing the preassembly device. At the same time, the preassembly device has a support element comprising at least one sealing element. At least one sealing element is provided or arranged by centering the preassembly device utilizing the centering element. It seals at least one outlet opening in the region of the mounting interface. For this purpose, the support element extends away from the preassembly device. For example, the support element may extend away from the central axis of the preassembly device at least partially in a radial direction. The radial direction is to be understood concerning the central axis of the preassembly device. Preferably, the support element thereby extends so far in a radial direction away from the central axis that it overlaps with at least one outlet opening. At the overlap position, the sealing element can then be attached to a carrier (which may also be referred to herein as a carrier element, a carrier member, support member, or a support element), for example. The invention thus provides a low-cost and simple sealing of the outlet openings on the body in the region of the mounting interface. By integrating the sealing function into the preassembly device, the assembly process of the air spring as a whole and the sealing of the outlet openings on the body in the region of the assembly interface are simplified. Thus, no separate sealing element is required. Sealing of the outlet openings can now be done simultaneously during the preassembly of the air spring.

In one example, it is conceivable that the support member may include a body contact surface and an air spring contact surface opposite the body contact surface, wherein the sealing member is disposed on the body contact surface.

In this example, the support element may be flanged or disc-shaped, with the support element extending radially away from the preassembly device and around the central axis of the preassembly device. The body contact surface is then provided or arranged on the side of the carrier element facing the body or body part on which the mounting interface is provided or arranged. The opposite side of the carrier element then has the air spring contact surface.

It is also conceivable, for example, that the support element can be designed like a disc spring.

In this example, the support element can be concave with the body contact surface and convex with the air spring contact surface in an untensioned state of the preassembly device and flat in a tensioned state. However, it is advantageous if an untensioned state is converted to a tensioned state by mounting the air spring on the mounting interface.

It is also conceivable that, for example, the mounting interface can be concave, and the carrier element can be flat in a relaxed state or can also be slightly curved. In this example, the carrier element can be formed to match the concave mounting interface in the tensioned state.

Due to the disc-spring-like design of the carrier element, the carrier element is pretensioned during the preassembly of the air spring at the assembly interface. During pretensioning, the carrier element is transferred from a frustoconical state to a disc-shaped state. The previously concave body contact surface is therefore laid flat against the body due to the pretensioning of the carrier element. In the process, at least one sealing element is pressed against the body or body part and seals the outlet opening. When the air spring is disassembled, the pretensioning of the carrier element falls away, and the carrier element moves back into the shape of a disc spring. When the air spring is preassembled again, a preload is again applied to the carrier element. The sealing element arranged on the body contact surface is pressed against the body or body part accordingly. Thus, after disassembly of the air spring with the same preassembly device, the sealing of at least one outlet opening can be affected again.

For example, the support member and the at least one sealing member may be annular and may extend about a central axis of the preassembly device.

In another example, it is conceivable that at least one sealing element can have at least two annular sealing ribs with different radii provided or arranged concentrically on the support element.

The sealing ribs are provided or arranged on the body by the centering element in such a way that the outlet opening is provided or arranged in the radial direction between the two sealing ribs. In the direction of the central axis of the preassembly device, which may correspond to the cylinder axis of the air spring, the sealing rib with the smaller radius then seals in the direction away from the central axis of the preassembly device or the cylinder axis of the air spring, the sealing rib with the larger radius seals. Since the two sealing ribs are annular in design, the preassembly device can rotate about the cylinder axis at the assembly interface as desired. It will exhibit a sealing action in any orientation about the cylinder axis. This further simplifies the handling of the preassembly device.

In an alternative embodiment, the sealing element may include a cover element disposed over an outlet opening to seal the outlet opening. Further, alternatively, the sealing element may be annular, the annulus having a diameter. The annulus extends around and thereby seals the outlet opening.

According to one example, the centering element may include an opening for inserting a centering pin disposed on the mounting interface. The centering pin preferably includes at least one latching hook for locking the preassembly device to the mounting interface.

The air spring can have an opening into which the centering pin can also be inserted. In this way, the air spring can be easily preassembled at the mounting interface. The air spring with the preassembly device is simply pushed onto the centering pin to perform the preassembly.

Further, the centering element may, for example, comprise a centering pin for insertion into a centering aperture disposed on the mounting interface, the centering pin preferably comprising at least one latching hook for locking the preassembly device to the mounting interface.

In this example, the air spring can only have an opening for attaching the preassembly device with the connecting element to the air spring. Further, the air spring is merely inserted into the opening at the mounting interface for preassembly with the centering pin. Therefore, simple preassembly can also be carried out with this example.

For example, it is further conceivable that the preassembly device may comprise a first alignment partner for cooperating with a second alignment partner provided or arranged at an assembly interface for aligning the preassembly device in a predefined orientation at the assembly interface, wherein the first alignment partner is preferably provided or arranged at the centering element and preferably comprises a receptacle for receiving the second alignment partner.

The preassembly device can be automatically provided or arranged at the assembly interface in a specific orientation around the cylinder axis or the central axis with the two alignment partners. One alignment partner may be, for example, a pin or protrusion that is eccentric to the central axis. The other alignment partner may further be, for example, an opening or recess into which the pin may be inserted. If the centering member includes a centering pin and a centering aperture, the one alignment partner may be a centering pin, and the other may be disposed at the centering aperture. One alignment partner may be a recess on the centering pin or centering aperture, and the other alignment partner may be a projection that fits into the recess and is disposed on the centering aperture or centering pin. Thus, an alignment of the preassembly device or the sealing elements at the assembly interface can be performed by simple means.

Further, for example, the connecting element may comprise at least one latching hook for latching into a latching element connected to the air spring.

In this example, the connecting element can be engaged in the opening of the air spring, for example. The connecting element and the latching hook can parallel the central axis. Furthermore, the opening of the air spring can extend into the air spring along the cylinder axis. At least one latching element for the latching hook can be provided or arranged in the opening. When the latching hook is inserted into the opening, it hooks into the latching element. When the preassembly device is pulled out of the opening along the cylinder axis, it forms a positive connection.

In another example, the preassembly device may be a rotation body concerning the central axis.

Further, the invention relates to a system comprising a body having at least one mounting interface for an air spring, at least one outlet opening disposed at the mounting interface, an air spring disposed at the mounting interface. A preassembly device, according to the preceding description, wherein the preassembly device is connected to the air spring. The mounting interface and the sealing element seal the outlet opening. The air spring comprises a force-flow element that couples the air spring to the body separately from the preassembly device.

According to one example, it is conceivable that the support element can be designed like a disc spring.

Further, the preassembly device may, for example, be formed as a body of rotation concerning a central axis. The sealing element may be provided or arranged at a distance perpendicular to the central axis. The outlet opening is at the same distance from the central axis.

For example, the centering element may be formed as an opening. The mounting interface may have a centering pin extending through the opening. The centering pin preferably has at least one latching hook that undercuts the centering element.

In another example, the preassembly device may conceivably include a first alignment partner. In addition, the assembly interface may include a second alignment partner, wherein the first alignment partner and the second alignment partner are configured to align the preassembly device in a predefined orientation at the assembly interface.

Advantages and effects and further developments of the system result from the advantages and effects, as well as further developments of the preassembly device described above. Reference is therefore made in this respect to the preceding description.

BRIEF DESCRIPTION OF THE DRAWINGS

Further features, details, and advantages of the invention are apparent from the wording of the claims and from the following description of embodiments based on the drawings. Showing:

DETAILED DESCRIPTION

Figure 1:
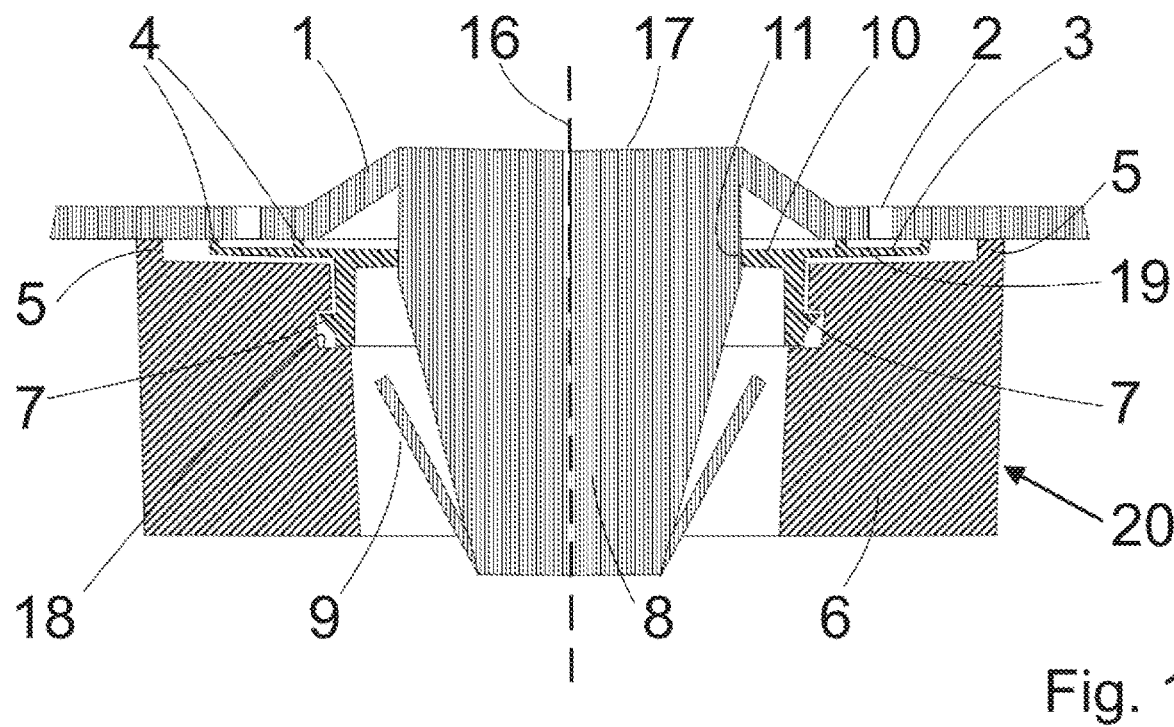
FIG. 1 a schematic sectional view of an air spring with a preassembly device at an assembly interface.

FIG. 1 shows a system 20 comprising a preassembly device 10 an air spring 6, and body 1 with an assembly interface 17 for an air spring.

An outlet opening 2 is provided or arranged at the assembly interface 17, which is required for a cathodic dip painting process of body 1. Body 1 can also be a body part attached to the rest of a vehicle or body.

A centering pin 8 is provided or arranged at the mounting interface 17, extending along an axis 16. It further has latching hook 9, which can be attached to the centering pin 8.

The air spring 6 with the preassembly device 10 is further provided or arranged at the assembly interface 17. The preassembly device 10 is connected to the air spring 6 via a connecting element 7 for connecting to an air spring. The connecting element 7 comprises at least one latching hook, which can be latched into a latching element 18 provided or arranged on the air spring 6 and connects the preassembly device 10 to the air spring 6.

The preassembly device 10 further comprises a centering element 11 formed as an opening. The centering pin 8 interacts with the centering element 11 in which the centering pin 8 is inserted through the opening. The diameter of the opening corresponds to the diameter of the centering pin 8, so that the preassembly device 10 is provided or arranged on the centering pin 8 without radial play. The centering pin 8 thus positions the preassembly device 10 at a predetermined position along the radial direction.

After the centering pin 8 has been inserted into the opening, the latching hooks 9 undercut the opening and prevent the preassembly device 10 from being released from the centering pin 8. Disconnection between the preassembly device 10 and the centering pin 8 can be effected by pressing in the at least one detent hook 9.

Figure 2:
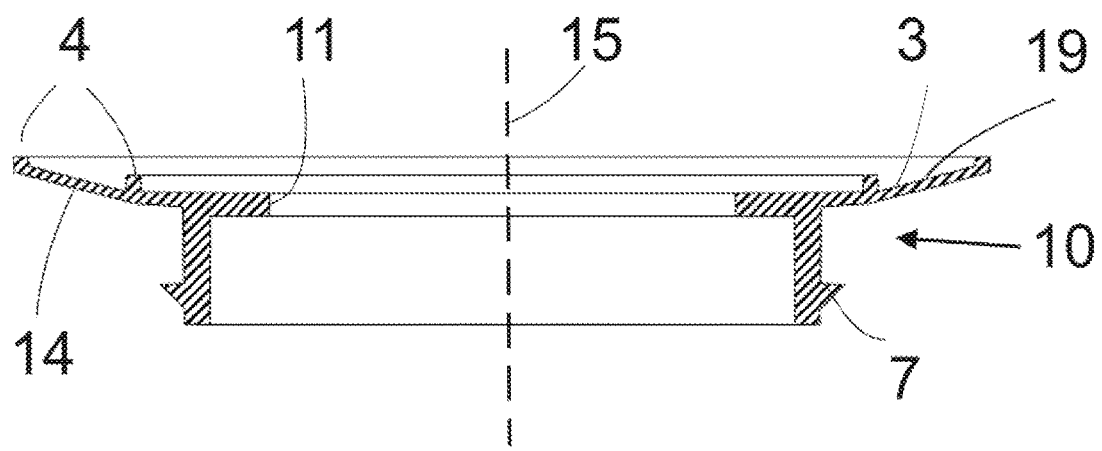
FIG. 2 a schematic sectional view of a preassembly device.

Further, the preassembly device 10 comprises a carrier element 3 extending away from the preassembly device 10. The support element 3 extends radially away from the axis 16. In the assembled state of the preassembly device 10 on the air spring 6, the axis 16 is congruent with a central axis 15 of the preassembly device 10, which is shown in FIG. 2. FIG. 2 shows a section through a plane through the central axis 15 of the preassembly device 10.

In this example, the preassembly device 10 is designed as a body of rotation around the central axis 15. It is thus rotationally symmetrical regarding the central axis 15.

Figure 3:
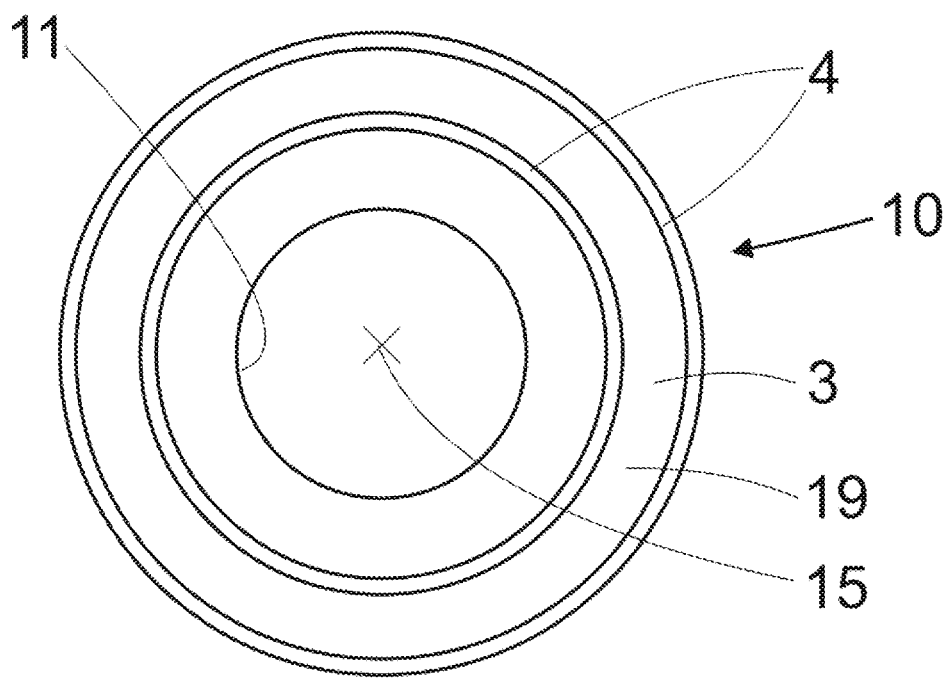
FIG. 3 a top view of a schematic diagram of a preassembly device.

At least one sealing element 4 is provided or arranged on the carrier element 3, which in this example has two sealing ribs extending circularly and concentrically around the axis 16, as shown in FIG. 3. The diameter of the circular sealing ribs differs. Further, the sealing ribs are provided or arranged such that at least one outlet opening 2 is provided or arranged in radial direction between the sealing ribs. In the direction of the centering pin 8, one of the sealing ribs seals the outlet opening 2. The other sealing rib seals the outlet opening 2 in the opposite direction.

In this example, a channel runs between the sealing ribs in a circumferential direction around the axis 16, which is sealed off from the air spring 6 and the centering pin 8 by the two sealing ribs.

According to FIG. 1, the air spring 6 is coupled to body 1 or the body part through a force-flow element 5. The force flow between the air spring 6 and the body 1 or the body part takes place via the force flow element 5. The preassembly device 10 lies outside the force flow between the air spring 6 and body 1 or the body part. The air spring 6 can be fixed to the body 1 using fixing elements not shown, for example, screws.

The preassembly device 10 is deformed during assembly of the air spring 6 at the assembly interface 17 between body 1 and the air spring 6. The deformation takes place on the support element 3, as shown from FIG. 2. The preassembly device 10 is shown in the non-assembled state.

The support element 3 has a plate spring-like or flange-like design. One body contact surface 19 of the carrier element 3, on which the sealing element 4 is provided or arranged, is concave. The opposite side of the carrier element 3 comprises an air spring contact surface 14, which is convex in the unassembled or untensioned state.

When the air spring 6 is preassembled with the preassembly device 10, the carrier element 3 of the cup-spring design is pretensioned. It is then in the tensioned state. In the process, the body contact surface 19 is pressed flat as shown in FIG. 1 so that the carrier element 3 extends almost radially away from the central axle 15 or the axle 16.

In an alternative example, not shown, the support element 3 can be biased from a flat or slightly curved shape into a concave shape by the mounting interface 17. In this case, the mounting interface 17 may have a concave shape against which the support element 3 is pressed during assembly.

The preload presses the sealing element 4 against body 1 and creates a seal.

Figure 4:
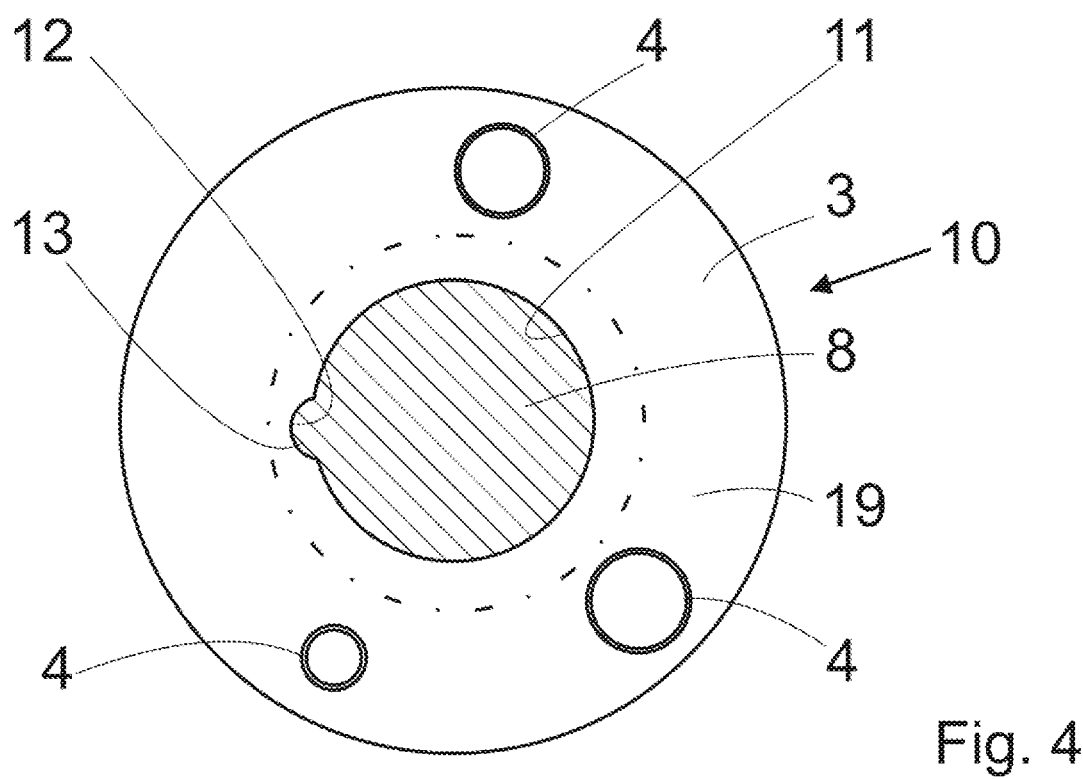
FIG. 4 a top view of another example of a schematic diagram of a preassembly device.

FIG. 4 shows another embodiment of the preassembly device 10. In this example, sealing element 4 has a plurality of sealing rings or sealing surfaces provided or arranged in a fixed relation regarding a first alignment partner 12. The first alignment partner 12 cooperates with a second alignment partner 13 on the centering pin 8 during preassembly. The centering pin 8 is shown here as a section in a plane perpendicular to axis 16 and provided or arranged in the centering element 11. The outlet openings 2 correspond to the second alignment partner 13 as the sealing elements 4 have to the first alignment partner 12.

In this example, the first alignment partner 12 is a recess at the opening of the centering element 11. In this example, the second alignment partner 13 is a projection on the centering pin 8. However, this would also be possible the other way around.

By means of the two alignment partners 12, 13, the preassembly device 10 can only be provided or arranged in a predefined alignment at the assembly interface 17. The sealing elements 4 are precisely aligned with and provided or arranged over the outlet openings 2 by the interaction of the two alignment partners 12, 13. The precise alignment allows the sealing elements 4 to seal the outlet openings 2 separately and with pinpoint accuracy.

A sealing element 4 may have a sealing surface that closes the entire associated outlet opening 2 in a lid-like manner. Alternatively, sealing elements 4 in this example can be designed as sealing rings. The sealing rings extend around the corresponding associated outlet openings 2.

In both examples, the sealing elements 4 are pressed against body 1 or the outlet openings 2 by the pretension of the carrier element 3 during preassembly. This condition is maintained during the final assembly of the air spring 6.

Alternatively, the support element 3 can be designed merely as a flange that extends, for example, in a disc-shaped manner around the central axis 15 of the preassembly device 10. In this example, the flange has at least one cone-shell-shaped section and is pressed during assembly between the air spring 6 and body 1. The sealing elements 4 are also provided or arranged on the flange and are also pressed against body 1 during preassembly and then seal the outlet openings 2.

The sealing element 4 can be formed in one piece with the carrier element 3. It can be made of the same material.

Further, the entire preassembly device 10 may be integrally made of a single material.

Further alternatively, the support element 3 can have a separate arm for each sealing element 4, which extends to the later position of the outlet opening 2. The arm may be designed to press the sealing element 4 against the outlet opening in the assembled state. This may provide a weight advantage or an advantage in matching the contact forces. Therefore, the support element 3 does not necessarily have to be designed as a disc.

The invention is not limited to any of the above-described embodiments. Still, it can be varied in a variety of ways. Therefore, all features and advantages resulting from the claims, the description, and the drawing, including constructional details, spatial arrangements, and process steps, can be essential to the invention both individually and in a wide variety of combinations.

The invention claimed is:

1. A preassembly device for preassembling an air spring on a body having an assembly interface, the preassembly device comprising:
    a centering member for centering the preassembly device on said assembly interface,
    a connector for connecting to said air spring, and
    a carrier extending away from the preassembly device and including a seal provided on the carrier that is configured for sealing an outlet opening of the body at said assembly interface, the centering member configured for aligning the seal and the outlet opening;
    wherein the centering member has an opening for inserting a centering pin provided on said assembly interface, the centering pin configured for locking the preassembly device on said assembly interface.

2. The preassembly device according to claim 1, wherein the carrier has a body contact surface and an air spring contact surface opposite the body contact surface, the seal disposed on the body contact surface.

3. The preassembly device according to claim 1, wherein the carrier has the shape of a disc spring.

4. The preassembly device according to claim 1, wherein the carrier and the seal are annular and extend around a central axis of the preassembly device.

5. The preassembly device according to claim 1, wherein the seal has at least two annular sealing ribs with different radii, which are provided concentrically on the carrier.

6. The preassembly device according to claim 1, wherein the centering pin includes a latching hook.

7. The preassembly device according to claim 1, wherein the preassembly device comprises a first alignment partner for cooperating with a second alignment partner provided at said assembly interface for aligning the preassembly device in a predefined orientation at said assembly interface.

8. The preassembly device according to claim 7, wherein the first alignment partner is provided at the centering member.

9. The preassembly device according to claim 8, wherein the first alignment partner comprises a receptacle for receiving the second alignment partner.

10. The preassembly device according to claim 1, wherein the connector has a latching hook for latching into a latching element connected to said air spring.

11. The preassembly device according to claim 1, wherein the preassembly device is configured as a body of rotation with respect to a central axis.

12. A preassembly device for preassembling an air spring on a body having an assembly interface, the preassembly device comprising:
    a centering member for centering the preassembly device on said assembly interface,
    a connector for connecting to said air spring, and
    a carrier extending away from the preassembly device and including a seal provided on the carrier that is configured for sealing an outlet opening of the body at the assembly interface, the centering member configured for aligning the seal and the outlet opening;
    wherein the centering member comprises a centering pin for insertion into a centering opening provided at said assembly interface, the centering pin comprises a latching hook for locking the preassembly device to said assembly interface.

13. A system comprising a body with an assembly interface, an outlet opening provided at the assembly interface, an air spring provided at the assembly interface, and a preassembly device; wherein the preassembly device includes a centering member for centering the preassembly device on the assembly interface, a connector for connecting to the air spring, and a carrier extending away from the preassembly device and including a seal provided on the carrier that is configured for sealing an outlet opening of the body at the assembly interface, the centering member configured for aligning the seal; wherein the preassembly device is connected to the air spring and the assembly interface and the seal seals the outlet opening; wherein the air spring has a force-flow element which couples the air spring to the body separately from the preassembly device; and wherein the centering member is configured as an opening and the assembly interface has a centering pin extending through the opening.

14. The system according to claim 13, wherein the centering member has an opening for inserting a centering pin provided on said assembly interface, the centering pin configured for locking the preassembly device on said assembly interface.

15. The system according to claim 13, wherein the carrier is configured as a disc spring.

16. The system according to claim 13, wherein the preassembly device is configured as a body of rotation with respect to a central axis, and the seal is provided at a distance perpendicular to the central axis, the outlet opening having the same distance from the central axis.

17. The system according to claim 13, wherein the centering pin has a latching hook that undercuts the centering member.

18. The system according to claim 13, wherein the preassembly device comprises a first alignment partner and the assembly interface comprises a second alignment partner.

19. The system according to claim 18, wherein the first alignment partner and the second alignment partner are configured to align the preassembly device in a predefined orientation at the assembly interface.

* * * * *